United States Patent
Ansorregui et al.

(10) Patent No.: US 11,455,757 B2
(45) Date of Patent: Sep. 27, 2022

(54) METHOD AND APPARATUS FOR RECONSTRUCTION OF ORIGINAL IMAGES FROM MODIFIED IMAGES

(71) Applicant: Samsung Electronics Co., Ltd., Suwon-si (KR)

(72) Inventors: Daniel Ansorregui, Staines Middlesex (GB); Albert Saa-Garriga, Staines Middlesex (GB); Tommaso Maestri, Staines Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/771,433

(22) PCT Filed: Oct. 22, 2018

(86) PCT No.: PCT/KR2018/012502
§ 371 (c)(1),
(2) Date: Jun. 10, 2020

(87) PCT Pub. No.: WO2019/124708
PCT Pub. Date: Jun. 27, 2019

(65) Prior Publication Data
US 2020/0380739 A1 Dec. 3, 2020

(30) Foreign Application Priority Data

Dec. 19, 2017 (GB) .................. 1721297
Jul. 20, 2018 (KR) .................. 10-2018-0084977

(51) Int. Cl.
G06T 11/00 (2006.01)
H04L 9/08 (2006.01)

(52) U.S. Cl.
CPC .......... *G06T 11/006* (2013.01); *H04L 9/0825* (2013.01)

(58) Field of Classification Search
CPC ......... G06T 11/006; G06T 11/60; G06T 5/50; G06T 5/005; G06T 2207/20224;
(Continued)

(56) References Cited

U.S. PATENT DOCUMENTS 8,374,349 B2 2/2013 Anan et al.
2009/0225843 A1 9/2009 Lee et al.
(Continued)

FOREIGN PATENT DOCUMENTS

CN 102930499 A 2/2013
CN 106412720 A 2/2017
(Continued)

OTHER PUBLICATIONS

UK Search and Examination Report dated Jun. 13, 2018 issued in a related application, UK Application No. GB1721297.8.
(Continued)

*Primary Examiner* — Christopher M Brandt
(74) *Attorney, Agent, or Firm* — Jefferson IP Law, LLP

(57) ABSTRACT

An image processing method is disclosed, comprising comparing a first image and a modified second image, the modified second image comprising a copy of the first image in which at least one pixel value of one or more pixels have been modified, and based on the result of the comparison, generating first image reconstruction information which can be combined with the modified second image to reconstruct the first image. A corresponding image reconstruction method comprises combining the image reconstruction information with the modified second image to reconstruct the first image. Apparatus for implementing the methods is also disclosed.

20 Claims, 5 Drawing Sheets

(58) Field of Classification Search
CPC ......... G06T 1/0021; G06T 7/00; G06T 5/001; G06T 7/70; G06T 2207/10016; H04L 9/0825; H04L 9/0891; H04L 9/0894; H04L 9/0861; G06F 21/606; G06F 21/602
See application file for complete search history.

(56) References Cited

U.S. PATENT DOCUMENTS

| | | |
|---|---|---|
| 2010/0086170 A1 | 4/2010 | Tian et al. |
| 2010/0123807 A1 | 5/2010 | Lee et al. |
| 2010/0195866 A1* | 8/2010 | Fisher ................ H04N 1/32208 382/100 |
| 2010/0254569 A1* | 10/2010 | Vial .................. H04N 1/32325 382/100 |
| 2012/0066493 A1* | 3/2012 | Widergren .......... H04L 63/0428 713/160 |
| 2015/0195565 A1 | 7/2015 | Jeong et al. |
| 2016/0148349 A1 | 5/2016 | Cho et al. |
| 2017/0238004 A1 | 8/2017 | Lee et al. |
| 2017/0301093 A1* | 10/2017 | Nakagomi ............ G06T 7/0016 |
| 2018/0232844 A1* | 8/2018 | Cai .................... H04N 1/32251 |
| 2018/0310423 A1 | 10/2018 | Koo et al. |
| 2019/0221919 A1 | 7/2019 | Koo et al. |

FOREIGN PATENT DOCUMENTS

| | | |
|---|---|---|
| CN | 108141981 A | 6/2018 |
| EP | 0 705 025 A2 | 4/1996 |
| EP | 1148408 A2 | 10/2001 |
| EP | 3344022 A1 | 7/2018 |
| GB | 2425906 A | 11/2006 |
| GB | 1721297.8 | 6/2018 |
| JP | 5071188 B2 | 11/2012 |
| KR | 10-1574733 B1 | 12/2015 |
| KR | 10-2016-0062571 A | 6/2016 |
| KR | 10-2017-0048043 A | 5/2017 |
| KR | 10-2018-0024583 A | 3/2018 |
| WO | 2009-074618 A1 | 6/2009 |
| WO | 2011-034507 A1 | 3/2011 |
| WO | 2017-073893 A1 | 5/2017 |
| WO | 2017-128655 A1 | 8/2017 |
| WO | 2017-137358 A1 | 8/2017 |

OTHER PUBLICATIONS

European Office Action dated May 31, 2021, issued in European Patent Application No. 18 890 347.0.
European Search Report dated Dec. 10, 2020, issued in European Application No. 18890347.0.
Korean Office Action with English translation dated Jul. 18, 2022; Korean Appln. No. 10-2018-0084977.

* cited by examiner

[Fig. 1]
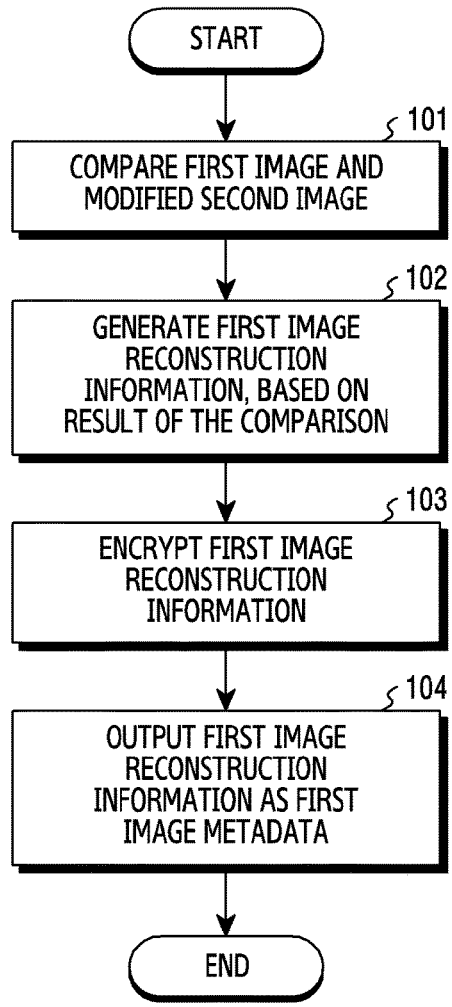
[Fig. 2]
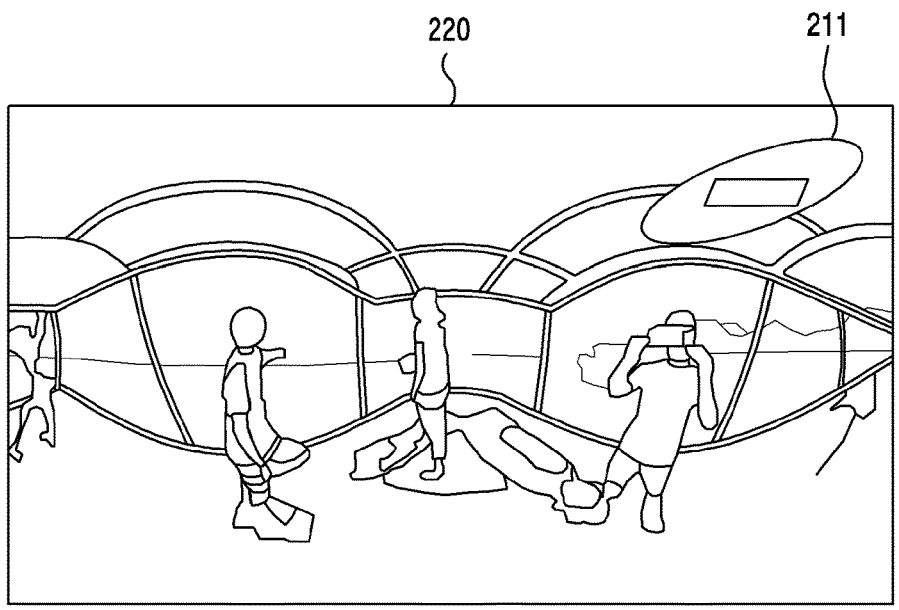

[Fig. 3]
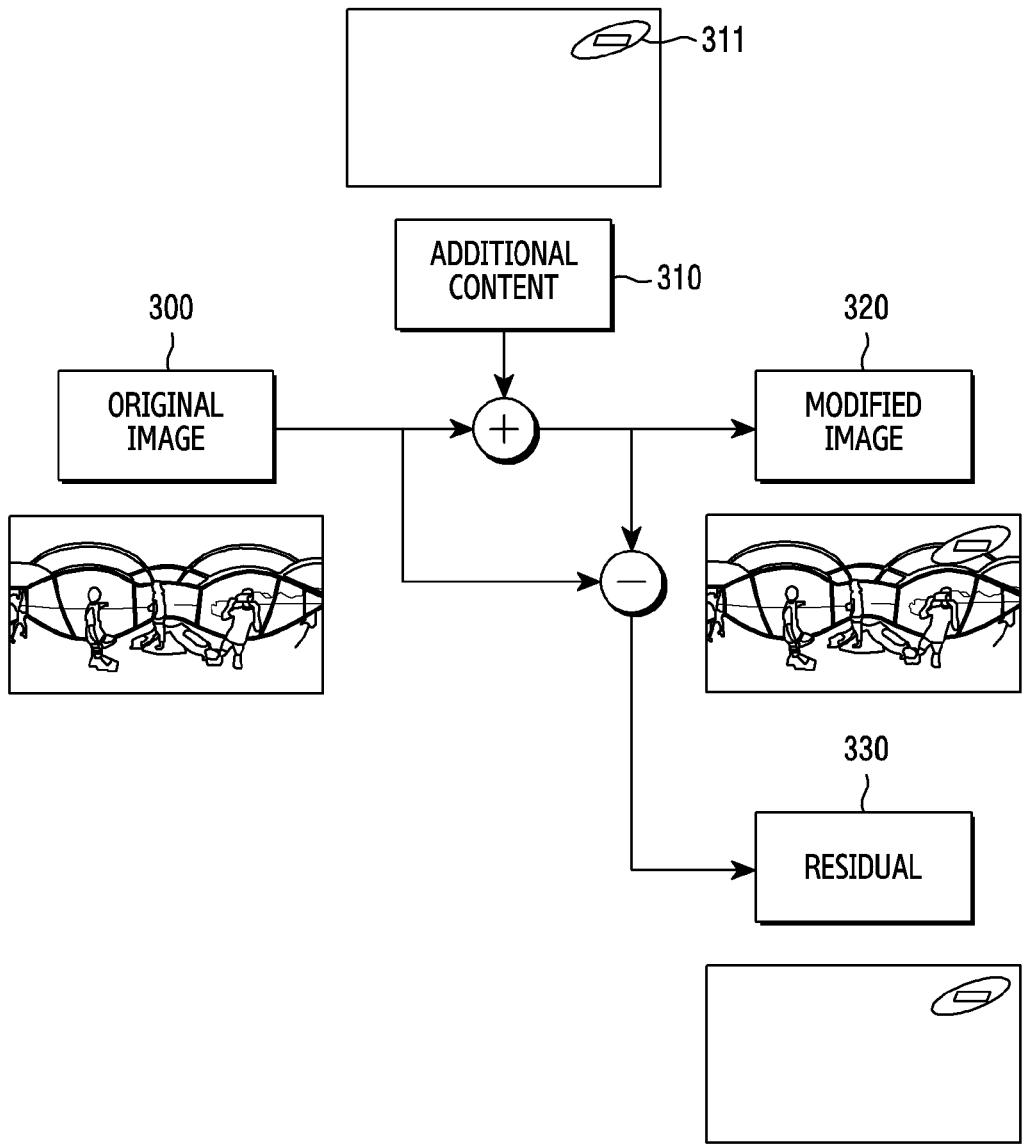
[Fig. 4]
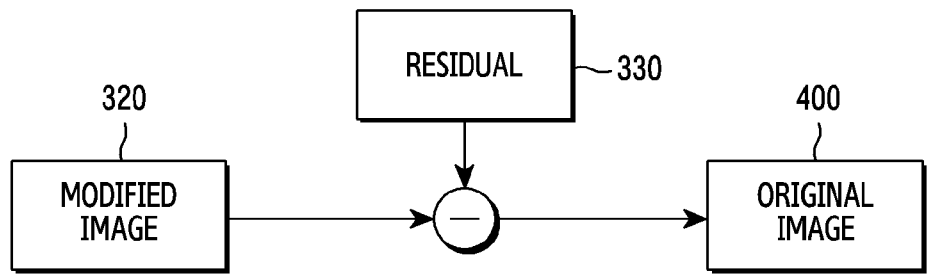

[Fig. 5]
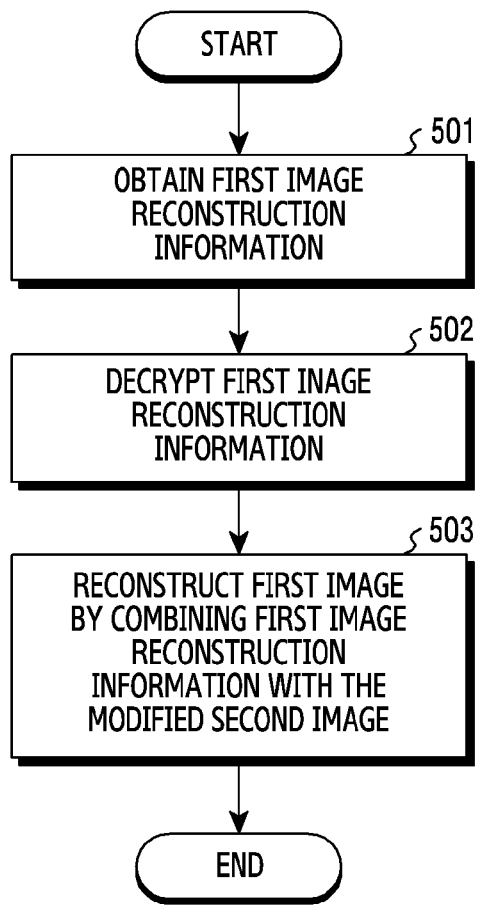
[Fig. 6]
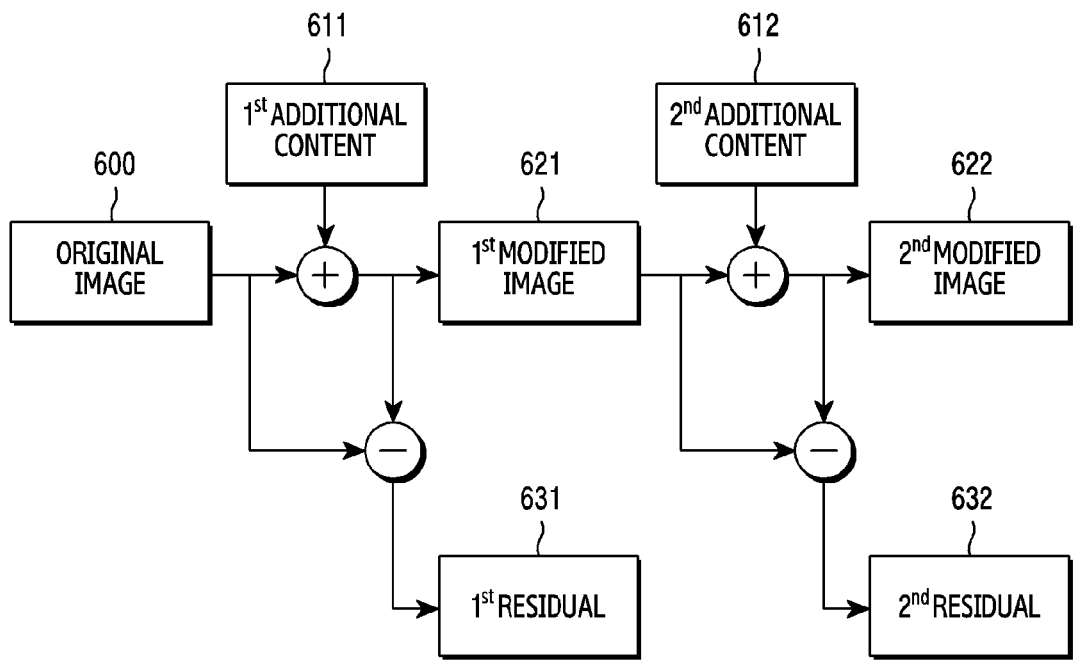

[Fig. 7]
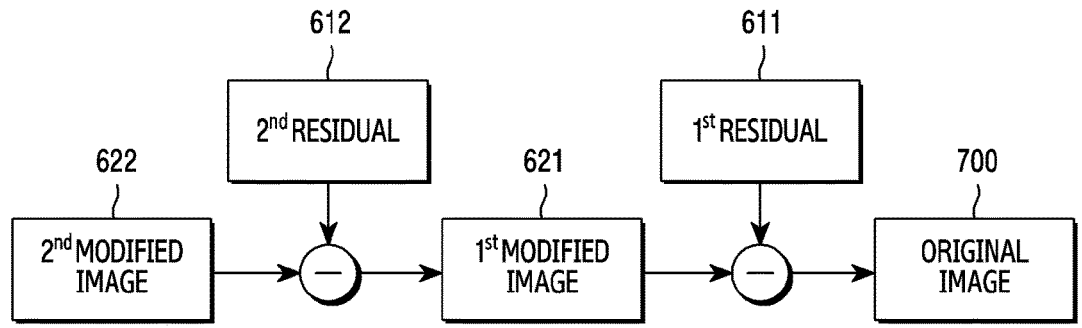
[Fig. 8]
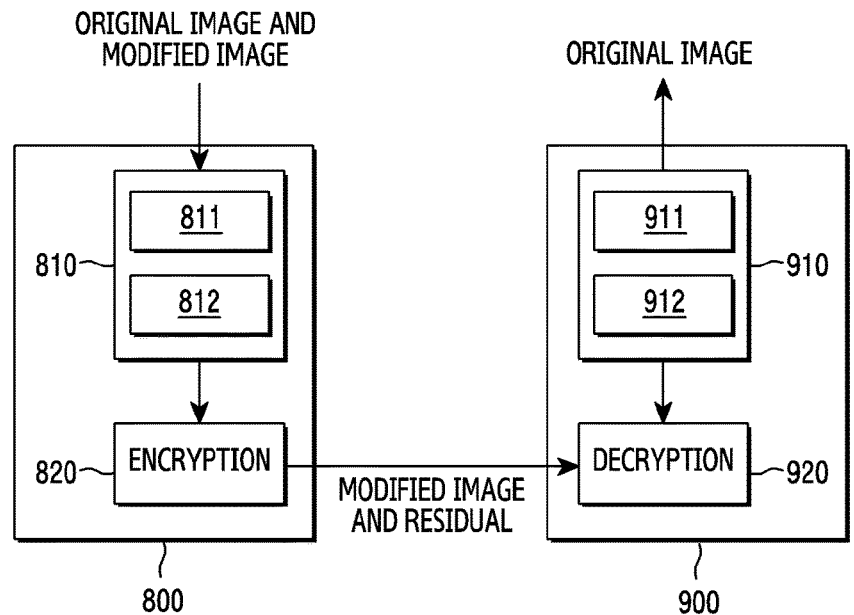
[Fig. 9]
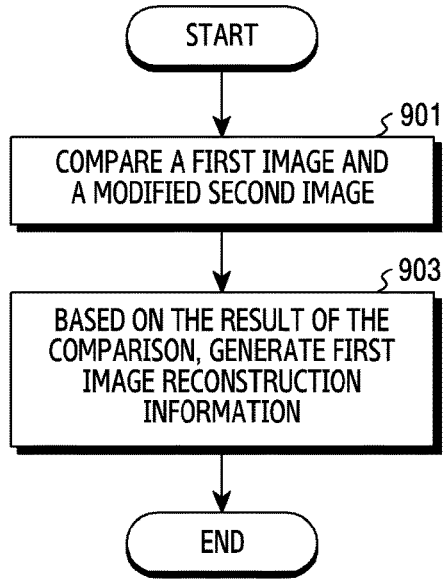

[Fig. 10]
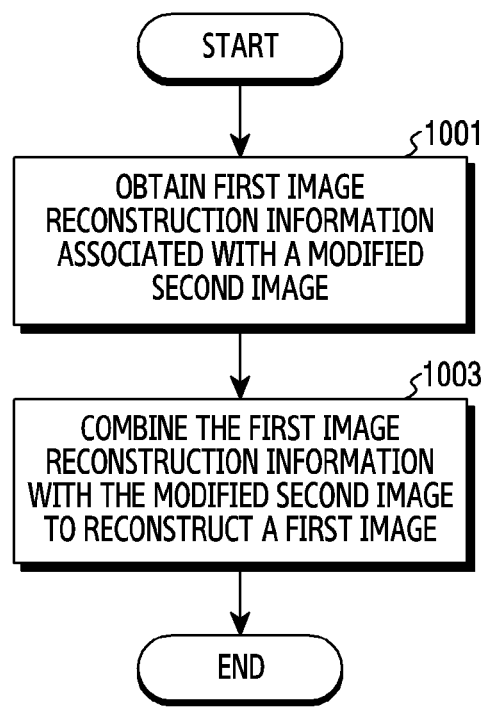

METHOD AND APPARATUS FOR RECONSTRUCTION OF ORIGINAL IMAGES FROM MODIFIED IMAGES

TECHNICAL FIELD

The present invention relates to methods, apparatus and computer programs for enabling an original image to be reconstructed from a modified copy of the image.

BACKGROUND ART

When creating multimedia content, some content creators may wish to modify the original content in some way. For example, original content such as images or video can be modified during editing by adding a watermark, changing privacy conflicting content (e.g. blurring out of logos or faces), adding embellishments such as icons, writing or drawings, applying filters, or adding interactive objects. When the original content is modified to produce an edited image or video, the original content will be permanently lost. If necessary, a copy of the original content may be stored together with the edited image or video, to preserve the original content.

Reconstructing image is associated with filing unknown regions of an image, including removing the modified portion of the copy image and recovering the removed portion of the original image. There is a need for a method for efficiently reconstruction an original image from a modified copy image. The invention is made in this context.

DISCLOSURE OF INVENTION

Technical Problem

An aspect of the present disclosure to provide a method and an apparatus for efficient reconstruction of original images from modified images.

Solution to Problem

According to various embodiments of the present disclosure, a method for processing an image is provided. The method comprises: comparing a first image and a modified second image, the modified second image comprising a copy of the first image in which at least one pixel value of at least one replaced pixel has been modified; and based on the result of the comparison, generating first image reconstruction information which can be combined with the modified second image to reconstruct the first image.

According to various embodiments of the present disclosure, a method for reconstructing an image is provided. The method comprises: obtaining first image reconstruction information associated with a modified second image; and combining the first image reconstruction information with the modified second image to reconstruct a first image, the modified second image comprising a copy of the first image in which at least one pixel has been replaced.

According to various embodiments of the present disclosure, a non-transitory computer readable storage medium adapted to store computer program instructions which, when executed, perform a method according to any one of the preceding methods.

According to various embodiments of the present disclosure, an apparatus for processing an image is provided. The apparatus comprises: at least one processor; and memory adapted to store computer program instructions which, when executed by the at least one processors, cause the image processing apparatus to compare a first image and a modified second image, the modified second image comprising a copy of the first image in which at least one pixels have been replaced, and based on the result of the comparison, generate image reconstruction information which can be combined with the modified second image to reconstruct the first image.

According to various embodiments of the present disclosure, an apparatus for reconstructing an image is provided. The apparatus comprises: at least one processor; and memory adapted to store computer program instructions which, when executed by the at least one processors, cause the image reconstruction apparatus to obtain image reconstruction information associated with a modified second image, and combine the image reconstruction information with the modified second image to reconstruct a first image, the modified second image comprising a copy of the first image in which at least one pixels have been replaced.

Advantageous Effects of Invention

Various embodiments of the present disclosure provide a method and an apparatus for efficient reconstruction of original images from modified images.

BRIEF DESCRIPTION OF DRAWINGS

Embodiments of the present invention will now be described, by way of example only, with reference to the accompanying drawings, in which:

FIG. 1 illustrates a flowchart showing an image processing method, according to an embodiment of the present invention;

FIG. 2 illustrates a modified image obtained by combining an original image with additional content, according to an embodiment of the present invention;

FIG. 3 illustrates a method of generating image reconstruction information, according to an embodiment of the present invention;

FIG. 4 illustrates a method of reconstructing an original image using the image reconstruction information, according to an embodiment of the present invention;

FIG. 5 illustrates a flowchart showing an image reconstruction method, according to an embodiment of the present invention;

FIG. 6 illustrates a method of generating first image reconstruction information and second image reconstruction information for a first modified image and a second modified image, according to an embodiment of the present invention;

FIG. 7 illustrates a method of reconstructing the first modified image and the original image using the first image reconstruction information and the second image reconstruction information, according to an embodiment of the present invention;

FIG. 8 illustrates a system comprising an image processing apparatus and an image reconstruction apparatus, according to an embodiment of the present invention;

FIG. 9 illustrates a flowchart showing an image processing method, according to an embodiment of the present invention; and FIG. 10 illustrates a flowchart showing an image reconstruction method, according to an embodiment of the present invention.

BEST MODE FOR CARRYING OUT THE INVENTION

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Referring now to FIG. 1, a flowchart showing an image processing method is illustrated, according to an embodiment of the present invention. Depending on the embodiment, all steps in the method may be performed at the same device, or different steps may be performed in different devices. Any of the steps illustrated in FIG. 1 may be performed in software or in hardware, depending on the particular embodiment. When one or more steps are performed in software, apparatus for performing the method may include a processing unit comprising one or more processors, and computer-readable memory having stored therein computer program instructions which, when executed by the processing unit, perform the respective method steps.

First, in step S101 comparing a first image is compared to a second image. The second image is a copy of the first image in which pixel values of one or more pixels have been modified, and is hereinafter referred to as a modified second image. For example, the pixel values of the original image may have been modified by overlaying additional content such as a watermark, logo, icon or other type of content on top of the original image, such that the original pixel information at the location of the additional content is lost in the modified second image.

FIG. 2 illustrates an example of a modified second image obtained by combining an original image with additional content, according to an embodiment of the present invention. In the present embodiment the modified second image 220 is a frame of 360 degree video in which a broadcaster's logo 211 has been superimposed over content in the top right-hand corner of the screen. In other embodiments the techniques disclosed herein may be applied to different types of content other than 360 degree video, such as two-dimensional video, scalable video or still images.

Continuing with reference to FIG. 1, in step S102, first image reconstruction information is generated based on the result of the comparison. The first image reconstruction information can be combined with the modified second image to reconstruct the first image. For example, as will be described in more detail later, the first image reconstruction information may comprise residual pixel values calculated as the difference between values of corresponding pixels in the first image and the modified second image, or may comprise the original values of pixels which have been replaced in the modified second image.

Then, in the present embodiment the first image reconstruction information is encrypted in step S103. Applying encryption to the first image reconstruction information can give the content creator control over who is able to access the original content. Different encryption techniques may be used in different embodiments. For example, in step S103 symmetric or asymmetric encryption may be used to encrypt the first image reconstruction information. In some embodiments encryption may be omitted, such that any party can access the first image reconstruction information and consequently reconstruct the original image.

When asymmetric encryption is used, only the private key holder will be able to decrypt the first image reconstruction information and proceed to reconstruct the original image. At the same time, asymmetric encryption can allow anyone to create content and protect the first image reconstruction information by applying encryption using the public key.

In some embodiments additional content in a plurality of separate layers may be combined with the original image. In such embodiments, separate image reconstruction information may be generated for each layer of additional content, allowing intermediate modified images to be reconstructed by removing the additional content from specific layers. When image reconstruction information for a plurality of layers is generated, the image reconstruction information for each layer may be encrypted independently of the information for another layer. For example, the image reconstruction information for one layer of additional content may be encrypted using symmetric encryption, and the image reconstruction information for a different layer of additional content may be encrypted using asymmetric encryption.

Furthermore, when image reconstruction information for a plurality of layers is generated, the image reconstruction information for different layers may be encrypted using different keys. For example, one set of users may be allowed to remove a top layer of additional content from the modified image, but only users who possess the decryption keys for all layers will be able to access the original content.

Through the use of image reconstruction information, embodiments of the present invention can enable the original content to be recovered subsequently after it has been modified. By applying encryption, as described above in relation to step S103, it can be ensured that only a holder of the decoding key can access the original content.

In the present embodiment, once the first image reconstruction information has been generated and encrypted, in step S104 the encrypted first image reconstruction information is then stored as metadata associated with the modified second image. For example, the first image reconstruction information may be stored in the same file as the modified second image itself. Alternatively, the first image reconstruction information may be stored separately to the modified second image. For example, the first image reconstruction information may be stored at a server and provided upon request to a user who wishes to reconstruct the original image.

Referring now to FIG. 3, a method of generating image reconstruction information is illustrated according to an embodiment of the present invention. In the present embodiment, first image reconstruction information is generated which comprises residual values 330. Each residual value 330 is associated with a pixel for which the original pixel value has been replaced by a pixel of the additional content 310 in the modified second image 320. A pixel in which the original value has been replaced by a pixel of the additional content 310 is hereinafter referred to as a "replaced pixel".

As shown in FIG. 3, in the present embodiment an original image 300 is combined with additional content 310 comprising a logo 311 in the upper right-hand corner of the image, similar to the example shown in FIG. 2. When combining the original image 300 and the additional content 310, each pixel of the additional content replaces the pixel at the same location in the original image 300. By combining the original image 300 and the additional content 310 in this way, a modified second image 320 is generated which comprises one or more replaced pixels.

Each residual value is generated by subtracting a value of a pixel in one of the first or second images from a value of the corresponding pixel in the other one of the first or second images 300, 320. Here, a "corresponding" pixel refers to a pixel at the same location in one image as the pixel currently being processed from the other image. In the present embodiment the value of a pixel in the original image 300 is subtracted from the value of the corresponding pixel at the same location in the modified second image 320.

When residual values are used as the first image reconstruction information 330, the format in which the residual values are stored may vary according to the particular embodiment. For example, in some embodiments the residual values of any replaced pixels may be stored as metadata included in the modified second image 320, together with coordinates of the replaced pixels.

In other embodiments the residual values may be stored as a residual image. In a residual image, a pixel at the same location as a replaced pixel in the modified second image 310 is used to store the residual value for that replaced pixel. All other pixels in the residual image, that is to say, all pixels which do not correspond to a replaced pixel, can be set to zero since the corresponding pixels have the same value in the modified second image 320 and in the original first image 300. Since many of the residual values will be zero, the file size of the residual image can be small relative to the original image file. Therefore the residual image can be stored as metadata embedded in the modified second image 320 without significantly increasing the total file size.

A residual image may be generated by subtracting one of the first or second images 300, 320 from the other one of the first or second images 300, 320. In some embodiments the subtraction calculation may be performed for each pixel in the modified second image 320, resulting in a residual image with the same size and resolution as the first and second images 300, 320. The calculation will return a value of zero for any pixels which were not replaced in the modified second image 320, since these pixels will keep the same values as in the original first image 300.

Alternatively, a residual image may be generated by checking the coordinates of the pixels included in the additional content 310, and only performing calculations for the corresponding pixel locations in the modified second image 320. The values of any remaining pixels in the residual image may be automatically set to zero without performing a calculation for each pixel, since it may be assumed that the corresponding pixels in the modified second image 320 and the original first image 300 will have the same value as each other, and so the result of the calculation would be zero. This approach can reduce the processing burden by avoiding having to perform unnecessary calculations. However, in some embodiments it may be beneficial to calculate a residual value for every pixel in the residual image. For example, if the modified second image 320 is compressed, the values of some pixels in the modified second image 320 may be different to the values of corresponding pixels in the first image 300 even though they have not been replaced by the additional content 310.

In some embodiments, the residual values may be stored at a higher precision than the pixel values of the first and second images 300, 320. For example, in one embodiment each pixel value of the original first image 300 may be stored using 8 bits, and each residual value may be stored at a +2 bit precision relative to the original values, meaning that each residual value may be stored using 10 bits. This approach can avoid any saturation occurring in bright or dark areas of the image.

As an alternative to using a residual image having the same size and resolution as the first and second images 300, 320, in some embodiments the residual image may take the form of a partial image having a smaller size than each of the first and second images 300, 320. A partial residual image may be generated by subtracting part of the first image from a corresponding part of the second image. For example, if the additional content is restricted to a region of size N1×N2 pixels, then a partial residual image of resolution N1×N2 may be generated by only subtracting pixels within the N1×N2 region of one of the first and second images 300, 320 from the corresponding pixels of the other image 300, 320. In this way, the partial residual image may have a lower resolution than each of the first and second images.

When a partial residual image is generated, the first image reconstruction information may also include information identifying a position of the partial image within the first and second images. In some embodiments this information could be omitted, for example if it is known in advance that the additional content will always occupy the same position in the image. This may apply, for example, in the case of a broadcaster logo which is always displayed in the same screen position throughout all frames of a video.

In some embodiments in which partial residual images are used, the residual image may be divided into a plurality of partial image regions distributed across the full area of the first and second images 300, 320. The residual image may only include partial images for those partial image regions in which one or more pixels have been modified in the second image 320. For example, each partial image region may be identified by an index, and a partial image can be stored together with an identifier corresponding to the index of the partial image region to which the partial image relates.

In the case of a video file comprising a sequence of frames, each frame may be divided into a plurality of partial image regions distributed across the full area of the image. The plurality of partial image regions may be equal in size, or may have different sizes. When pixels of the video are modified, for example by combining the video with additional content in the form of a logo or watermark, a plurality of modified frames are obtained. In any given modified frame, each partial image region may or may not include modified pixels, that is, pixels that have been modified relative to an original version of the frame. It can be checked whether a particular partial image region contains modified pixels by comparing pixels in the partial image region of the modified frame to corresponding pixels in the original version of the frame.

The partial image regions may be identified in different ways, for example using the coordinates of one corner of the region, or the coordinates of the centre of the region, or by assigning a unique index to each region. In the present embodiment each partial image region is identified using the coordinates of the pixel at the top left corner of the region. For example, a partial image region with coordinates 0,0 is the region at the top left of the frame. Supposing that the region at 0,0 contains modified pixels during the first 100 frames of the video, a partial residual video of 100 frames can be generated for the region at 0,0. The partial residual video comprises a partial residual image for each one of the first 100 frames of the video.

If the same region again contains modified pixels at frames 1000 to 1100, a new sequence of partial residual images can be added to the partial residual video with time stamps from 1000 to 1100, indicating that these partial residual images should be combined with the respective modified frames at time stamps 1000 to 1100 in the modified video. In this way the partial residual video of only 200 frames is required for 1100 frames of modified video, since the region in question does not contain any modified pixels between frames 101 and 999. This approach provides an efficient way of storing image reconstruction information for a video file.

As an alternative, in some embodiments the partial residual video may be extended by adding partial residual images with zero content between frames 101 to 999. As a further alternative, the new sequence of partial residual images with time stamps from 1000 to 1100 can be stored as a new partial residual video, rather than as a continuation of the partial residual video for frames 1 to 100.

In the embodiment shown in FIG. 3, the first image reconstruction information comprises residual values. In other embodiments the first image reconstruction information may be provided in a different form. For example, in some embodiments the first image reconstruction information may comprise one or more original pixel values each associated with a replaced pixel. Each original pixel value contains the value of the corresponding pixel in the first image 300. When original pixel values are provided as the first image reconstruction information, the original image can be reconstructed by replacing the corresponding pixels in the modified second image with the original pixel values.

Referring now to FIG. 4, a method of reconstructing an original image using the image reconstruction information generated in FIG. 3 is illustrated, according to an embodiment of the present invention. The first image reconstruction information is combined with the modified second image 320 by summing the one or more residual values with one or more corresponding pixels in the modified second image 320, to determine values of said one or more corresponding pixels in the first image 300. In this way, a copy 400 of the original image 300 can be obtained. For example, when the first image reconstruction information comprises a residual image, the original image can be reconstructed by summing the residual image and the modified second image.

Here, 'summing' may involve either adding or subtracting, depending on whether the residual is obtained by subtracting the modified image from the original image (or vice versa), or by adding the original image and the modified image. For example, a residual value for the nth pixel, Rn, can be defined as:

$$R_n = O_n - M_n \quad (1)$$

or as:

$$R_n = O_n + M_n \quad (2)$$

where $O_n$ is the original value of the nth pixel in the original image, and $M_n$ is the modified value of the $n^{th}$ pixel in the modified image. In the case of equation (1) above, the original image can be reconstructed by calculating the original pixel value as follows:

$$O_n = R_n + M_n \quad (3)$$

whereas in the case of equation (2) above, the original image can be reconstructed by calculating the original pixel value as follows:

$$O_n = R_n - M_n \quad (4)$$

Referring now to FIG. 5, a flowchart showing an image reconstruction method is illustrated, according to an embodiment of the present invention. Depending on the embodiment, all steps in the method may be performed at the same device, or different steps may be performed in different devices. Any of the steps illustrated in FIG. 5 may be performed in software or in hardware, depending on the particular embodiment. When one or more steps are performed in software, apparatus for performing the method may include a processing unit comprising one or more processors, and computer-readable memory having stored therein computer program instructions which, when executed by the processing unit, perform the respective method steps.

The method starts in step S501 by obtaining first image reconstruction information associated with a modified second image. For example, in step S501 the first image reconstruction information may be retrieved from storage or may be received through a broadcast stream. When the first image reconstruction information is embedded as metadata in the modified second image, the first image reconstruction information and the modified second image may be obtained at the same time in step S501.

In the present embodiment, the method as shown in FIG. 5 is configured to reconstruct an image based on first image reconstruction information that was generated using a method similar to the one shown in FIG. 1, in which the first image reconstruction information is encrypted. As such, the method of FIG. 5 starts by decrypting the first image reconstruction information in step S502. In embodiments in which the first image reconstruction information is not encrypted, step S502 may be omitted.

Then, in step S503 the first image reconstruction information 330 is combined with the modified second image 320 in order to reconstruct the first image 400. The process by which the first image reconstruction information 330 is combined with the modified second image 320 may vary according to the format in which the first image reconstruction information 330 is provided. For example, in the embodiment described above with reference to FIG. 4, the first image reconstruction information 330 is combined with the modified second image 320 by summing the one or more residual values with one or more corresponding pixels in the modified second image 320, to determine the original pixel values of the first image 300. Alternatively, if the first image reconstruction information 330 contains the original pixel values of the first image 300, the first image reconstruction information 330 and the modified second image 320 can be combined by replacing pixels of the modified second image 320 with the corresponding original pixel values from the first image reconstruction information 330.

In some embodiments, additional content in a plurality of separate layers may be combined with the original image. In such embodiments, separate image reconstruction information may be generated for each layer of additional content, allowing intermediate modified images to be reconstructed by removing the additional content from specific layers.

Referring now to FIG. 6, a method of generating first image reconstruction information and second image reconstruction information for first and second modified images is illustrated, according to an embodiment of the present invention. Although two layers of additional content are illustrated in FIG. 6, it will be understood that the principle can be extended to any number of layers.

In the embodiment of FIG. 6, an original image 600 is combined with first additional content 611 in order to generate a first modified image 621, using a similar method as described above in relation to FIG. 3. Then, the first modified image 621 is combined with second additional content 612 in order to generate a second modified image 622, again using a similar method as described above in relation to FIG. 3. Depending on the relative positions of the first additional content 611 and the second additional content 612, one or more pixels of the first additional content 611 may be replaced by the second additional content 612. The second additional content 612 can therefore be considered as occupying a higher layer than the first additional content 611, which in turn can be considered as occupying a higher layer than the original image 600.

As shown in FIG. 6, first image reconstruction information 631 and second image reconstruction information 632 is generated. The first image reconstruction information 631 can be combined with the first modified image 621 to reconstruct the original image 600. The first image reconstruction information 631 can be generated using a method as described above in relation in FIG. 1, by comparing the first modified image 621 to the original image 600. The second image reconstruction information 632 can be combined with the second modified image 622 to reconstruct the first modified image 621. The second image reconstruction information 632 can also be generated using a method as described above in relation in FIG. 1, by comparing the second modified image 622 to the first modified image 621.

In the present embodiment, the first image reconstruction information 631 is generated by subtracting a pixel value of the original image 600 from a corresponding replaced pixel in the first modified image 621, and the second image reconstruction information 632 is generated by subtracting a pixel value of the first modified image 621 from a corresponding replaced pixel in the second modified image 622. Here, a "replaced pixel" in the second modified image 622 refers to a pixel of the first modified image 621 which has been replaced by the second additional content 612. In this way, the first image reconstruction information 631 and the second image reconstruction information 632 are both generated as residual values.

In another embodiment, one or both of the first image reconstruction information 631 and the second image reconstruction information 632 may be generated in a different format. For example, in one embodiment the first image reconstruction information 631 may comprise residual values calculated as the difference between corresponding pixels in the first modified image 621 and the original image 600, and the second image reconstruction information 632 may comprise original pixel values from the first modified image 621 for any replaced pixels in the second modified image 622. As described above, the image reconstruction information for each layer may be encrypted independently of the information for another layer, and may be encrypted using different keys.

Referring now to FIG. 7, a method of reconstructing the first modified image and the original image using the first and second image reconstruction information generated in FIG. 6 is illustrated, according to an embodiment of the present invention. The method starts by combining the second image reconstruction information 612 with the second modified image 622 in order to reconstruct the first modified image 621. As described above in relation to step S503 of FIG. 5, the process by which the second image reconstruction information 612 is combined with the second modified image 622 may vary according to the format in which the second image reconstruction information 612 is provided.

As with the method illustrated in FIG. 4, the first image reconstruction information 611 can then be combined with the first modified image 621 by summing the one or more residual values with one or more corresponding pixels in the first modified image 621, to determine values of said one or more corresponding pixels in the original image 600. In this way, a copy 700 of the original image 600 can be reconstructed. If either of the first image reconstruction information 611 and the second image reconstruction information 612 is encrypted, then the information may be decrypted using the appropriate decryption key before combining the decrypted information with the respective first or second modified image 621, 622. As described above, different keys may be used to decrypt the first image reconstruction information 611 and the second image reconstruction information 612.

Although only two layers are described in the present embodiment, it will be understood that the principles described here in relation to FIG. 7 may be extended to any arbitrary number of layers, to allow the intermediate modified images and the original image to be reconstructed.

Referring now to FIG. 8, a system comprising an image processing apparatus and an image reconstruction apparatus is illustrated, according to an embodiment of the present invention. In the present embodiment the system comprises an image processing apparatus 800 for generating image reconstruction information, and comprises a separate image reconstruction apparatus 900 for reconstructing an original image based on a modified image and the image reconstruction information generated by the image processing apparatus 800. In other embodiments some or all elements of the image processing apparatus 800 and the image reconstruction apparatus 900 may be embodied in a single physical device.

The image processing apparatus 800 comprises an image processing unit 810 comprising one or more processors 811, and memory 812 adapted to store computer program instructions. Although the image processing unit 810 is implemented in software in the present embodiment, in other embodiments the image processing unit 810 may be implemented in hardware, for example using a field programmable gate array (FPGA) chip.

When executed by the one or more processors 811 of the image processing unit 810, the computer program instructions stored in the memory 812 cause the image processing apparatus 800 to compare an original image and a modified image. Based on the result of the comparison, the image processing apparatus 800 generates image reconstruction information which can be combined with the modified second image to reconstruct the original image. The computer program instructions stored in the memory 812 can be configured to cause the image processing apparatus 800 to perform any of the methods disclosed herein for generating the image reconstruction information.

Additionally, in the present embodiment the image processing apparatus 800 further comprises an encryption unit 820 for encrypting the image reconstruction information. The encryption unit 820 may, for example, comprise a hardware encryption unit. In another embodiment, the encryption unit 820 may be implemented in software in the form of additional computer program instructions stored in the memory 812. Furthermore, in some embodiments encryption may not be applied, and the encryption unit 820 may be omitted.

The image reconstruction apparatus 900 comprises an image reconstruction unit 910 comprising one or more processors 911, and memory 912 adapted to store computer program instructions. Although the image reconstruction unit 910 is implemented in software in the present embodiment, in other embodiments the image reconstruction unit 910 may be implemented in hardware, for example using a field programmable gate array (FPGA) chip.

When executed by the one or more processors 911 of the image reconstruction unit 910, the computer program instructions stored in the memory 912 cause the image reconstruction apparatus 900 to obtain image reconstruction information associated with a modified image, and combine the image reconstruction information with the modified image to reconstruct a copy of the original image. The computer program instructions stored in the memory 912 can be configured to cause the image reconstruction apparatus 900 to perform any of the methods disclosed herein for reconstructing an image based on image reconstruction information.

Additionally, in the present embodiment the image reconstruction apparatus 900 further comprises a decryption unit 920 for encrypting the image reconstruction information. The decryption unit 920 may, for example, comprise a hardware encryption unit. In another embodiment, the decryption unit 920 may be implemented in software in the form of additional computer program instructions stored in the memory 912. Furthermore, in some embodiments encryption may not be applied, and the decryption unit 920 may be omitted.

FIG. 9 illustrates a flowchart showing an image processing method, according to an embodiment of the present invention.

Referring FIG. 9, in step 901, the method comprises comparing a first image and a modified second image, the modified second image comprising a copy of the first image in which at least one pixel value of at least one replaced pixel has been modified.

In step 903, the method comprises generating first image reconstruction information which can be combined with the modified second image to reconstruct the first image based on the result of the comparison. Preferably, wherein the first image reconstruction information comprises at least one residual value each associated with one of the at least one replaced pixel, and wherein each of the at least one residual values is generated by subtracting a pixel value of the at least one replaced pixel in one of the first image or the second image from a pixel value of the at least one replaced pixel in the other one of the first image or the second image. Preferably, wherein the first image reconstruction information comprises a residual image generated by subtracting one of the first image or the second image from the other one of the first image or the second image. Preferably, wherein the residual image comprises a partial image having a smaller size than each of the first image and the second image, wherein the partial image is generated by subtracting a part of the first image from a corresponding part of the second image. Preferably, wherein the first image reconstruction information includes information identifying a position of the partial image within the first image and the second image. Preferably, wherein the residual image is divided into a plurality of partial image regions distributed across the full area of the first image and second image, and wherein the residual image comprises at least one partial image each associated with a corresponding one of the partial image regions in which at least one pixel has been modified in the second image. Preferably, wherein the first image reconstruction information comprises at least one original pixel values each associated with one of the at least one replaced pixels, each original pixel value being a value of said replaced pixel in the first image.

According to various embodiments of the present disclosure, the method may further comprises: encrypting the first image reconstruction information. According to various embodiments of the present disclosure, wherein the first image and the modified second image correspond to at least one sequence of video frames, and the method further comprises: for each of the at least one sequence of video frames, checking whether each partial image region in the respective modified second image for the video frames contains at least one modified pixel; in response to a determination that one of the partial image regions contains at least one modified pixel, generating respective first image reconstruction information for the video frames; and storing the respective first image reconstruction information as a frame of a partial residual video corresponding to the one of the partial image regions, wherein each frame of the partial residual video is associated with a time stamp for identifying the at least one sequence of the video frames to which the frame of the partial residual video relates.

According to various embodiments of the present disclosure, the method further comprises: comparing the second image to a modified third image, the modified third image comprising a copy of the second image in which at least one pixels have been replaced; and based on the result of the comparison, generating second image reconstruction information which can be combined with the modified third image to reconstruct the second image. According to various embodiments of the present disclosure, the method further comprises: encrypting the second image reconstruction information, wherein an encryption key used to encrypt the first image reconstruction information is different to an encryption key used to encrypt the second image reconstruction information.

According to various embodiments of the present disclosure, a non-transitory computer readable storage medium adapted to store computer program instructions which, when executed, perform a method according to any one of the preceding methods.

According to various embodiments of the present disclosure, an apparatus for processing an image is provided. The apparatus comprises: at least one processor; and memory adapted to store computer program instructions which, when executed by the at least one processors, cause the image processing apparatus to compare a first image and a modified second image, the modified second image comprising a copy of the first image in which at least one pixels have been replaced, and based on the result of the comparison, generate image reconstruction information which can be combined with the modified second image to reconstruct the first image.

FIG. 10 illustrates a flowchart showing an image reconstruction method, according to an embodiment of the present invention.

Referring FIG. 10, in step 1001, the method comprises obtaining first image reconstruction information associated with a modified second image. Preferably, wherein the first image reconstruction information comprises at least one residual value each associated with one of the at least one replaced pixel, and wherein combining the first image reconstruction information with the modified second image comprises summing the at least one residual value with at least one corresponding pixel in the modified second image, to determine values of the at least one corresponding pixel in the first image.

In step 1003, the method comprises combining the first image reconstruction information with the modified second image to reconstruct a first image, the modified second image comprising a copy of the first image in which at least one pixel has been replaced. Preferably, wherein the first image reconstruction information comprises a residual image generated by subtracting one of the first image or the second image from the other one of the first image or the second image, and wherein combining the first image reconstruction information with the modified second image comprises summing the residual image and the modified second image. Preferably, wherein the first image reconstruction information comprises at least one original pixel value each associated with one of the at least one replaced pixel, each original pixel value being a value of said replaced pixel in the first image, and wherein combining the first image reconstruction information with the modified second image comprises replacing pixel values of at least one pixel in the modified second image with the corresponding original pixel values from the first image reconstruction information.

According to various embodiments of the present disclosure, the method further comprises: decrypting the first image reconstruction information. According to various embodiments of the present disclosure, wherein prior to reconstructing the first image the method further comprises: obtaining second image reconstruction information associated with a modified third image, the modified third image comprising a copy of the second image in which at least one pixel has been replaced; and combining the second image reconstruction information with the modified third image to reconstruct the second image. According to various embodiments of the present disclosure, the method further comprises: decrypting the second image reconstruction information, wherein an encryption key used to decrypt the first image reconstruction information is different to an encryption key used to decrypt the second image reconstruction information.

According to various embodiments of the present disclosure, a non-transitory computer readable storage medium adapted to store computer program instructions which, when executed, perform a method according to any one of the preceding methods.

According to various embodiments of the present disclosure, an apparatus for reconstructing an image is provided. The apparatus comprises: at least one processor; and memory adapted to store computer program instructions which, when executed by the at least one processors, cause the image reconstruction apparatus to obtain image reconstruction information associated with a modified second image, and combine the image reconstruction information with the modified second image to reconstruct a first image, the modified second image comprising a copy of the first image in which at least one pixels have been replaced.

Embodiments of the present invention have been described in which information is generated that can be used to reconstruct an original image, from a copy of the image in which one or more pixels have been modified, for example by replacing the pixels with additional content. In some embodiments, the image reconstruction information may be encrypted. This approach allows users to modify the original content in a similar manner as in conventional content editing techniques, whilst ensuring that the original content can still be recovered if desired. The file size of the image reconstruction information can be significantly less than the file size of the original content. Therefore, less storage space may be required to store the modified image and the image reconstruction information, in comparison to the amount of storage space that would be required to store both the modified image and the original image. Also, since the format of the modified image itself is not changed, the resulting image file can be understood by existing apparatus, for example a multimedia player, thereby providing backwards compatibility.

Whilst certain embodiments of the invention have been described herein with reference to the drawings, it will be understood that many variations and modifications will be possible without departing from the scope of the invention as defined in the accompanying claims.

The invention claimed is:

1. A method for processing an image, the method comprising:
    comparing a first image and a modified second image, the modified second image comprising a copy of the first image in which at least one pixel value of at least one replaced pixel has been modified; and
    based on the result of the comparison, generating separate image reconstruction information for each layer of additional content which can be combined with the modified second image to reconstruct the first image.

2. The method of claim 1, further comprising:
    encrypting the separate image reconstruction information for each layer of the additional content.

3. The method of claim 1,
    wherein the separate image reconstruction information for each layer of the additional content comprises at least one residual value each associated with one of the at least one replaced pixel, and
    wherein each of the at least one residual value is generated by subtracting a pixel value of the at least one replaced pixel in one of the first image or the second image from a pixel value of the at least one replaced pixel in the other one of the first image or the second image.

4. The method of claim 3, wherein the separate image reconstruction information for each layer of the additional content comprises a residual image generated by subtracting one of the first image or the second image from the other one of the first image or the second image.

5. The method of claim 4,
    wherein the residual image comprises a partial image having a smaller size than each of the first image and the second image, and
    wherein the partial image is generated by subtracting a part of the first image from a corresponding part of the second image.

6. The method of claim 5, wherein the separate image reconstruction information for each layer of the additional content includes information identifying a position of the partial image within the first image and the second image.

7. The method of claim 5,
    wherein the residual image is divided into a plurality of partial image regions distributed across the full area of the first image and second image, and
    wherein the residual image comprises at least one partial image each associated with a corresponding one of the partial image regions in which at least one pixel has been modified in the second image.

8. The method of claim 2, wherein the encrypting of the separate image reconstruction information for each layer of the additional content comprises encrypting the image reconstruction information for each layer independently from the information for another layer.

9. The method of claim 1,
    wherein the additional content includes first additional content and second additional content occupying a higher layer than the first additional content, and
    wherein the separate image reconstruction information for each layer includes:
        a first image reconstruction information used to delete the first additional content, and
        a second image reconstruction information used to delete the second additional content.

10. A method for reconstructing an image, the method comprising:
    obtaining separate image reconstruction information for each layer of additional content associated with a modified second image; and combining the separate image reconstruction information for each layer of the additional content with the modified second image to reconstruct a first image, the modified second image comprising a copy of the first image in which at least one pixel has been replaced.

11. The method of claim 10, further comprising:

decrypting the separate image reconstruction information for each layer of the additional content.

12. The method of claim 10, wherein the separate image reconstruction information for each layer of the additional content comprises at least one original pixel value each associated with one of the at least one replaced pixel, each original pixel value being a value of the replaced pixel in the first image, and wherein combining the separate image reconstruction information for each layer of the additional content with the modified second image comprises replacing pixel values of at least one pixel in the modified second image with the corresponding original pixel values from the separate image reconstruction information for each layer of the additional content.

13. An apparatus for processing an image, the apparatus comprising:

at least one processor; and memory adapted to store computer program instructions, wherein the at least one processor is configured to:

compare a first image and a modified second image, the modified second image comprising a copy of the first image in which at least one pixel has been replaced, and based on the result of the comparison, generate separate image reconstruction information for each layer of additional content which can be combined with the modified second image to reconstruct the first image.

14. The apparatus of claim 13, wherein the at least one processor is further configured to encrypt the separate image reconstruction information for each layer of the additional content.

15. The apparatus of claim 13, wherein the separate image reconstruction information for each layer of the additional content comprises at least one residual value each associated with one of the at least one replaced pixel, and wherein each of the at least one residual value is generated by subtracting a pixel value of the at least one replaced pixel in one of the first image or the second image from a pixel value of the at least one replaced pixel in the other one of the first image or the second image.

16. The apparatus of claim 15, wherein the separate image reconstruction information for each layer of the additional content comprises a residual image generated by subtracting one of the first image or the second image from the other one of the first image or the second image.

17. The apparatus of claim 16, wherein the residual image comprises a partial image having a smaller size than each of the first image and the second image, wherein the partial image is generated by subtracting a part of the first image from a corresponding part of the second image.

18. The apparatus of claim 17, wherein the residual image is divided into a plurality of partial image regions distributed across the full area of the first image and second image, and wherein the residual image comprises at least one partial image each associated with a corresponding one of the partial image regions in which at least one pixel has been modified in the second image.

19. The apparatus of claim 17, wherein the separate image reconstruction information for each layer of the additional content includes information identifying a position of the partial image within the first image and the second image.

20. The apparatus of claim 19, wherein the residual image is divided into a plurality of partial image regions distributed across the full area of the first image and second image, and wherein the residual image comprises at least one partial image each associated with a corresponding one of the partial image regions in which at least one pixel has been modified in the second image.

* * * * *